July 13, 1948. J. W. TEKER 2,445,192
TRACTION MOTOR BLOWER CONTROL
Filed Dec. 19, 1946
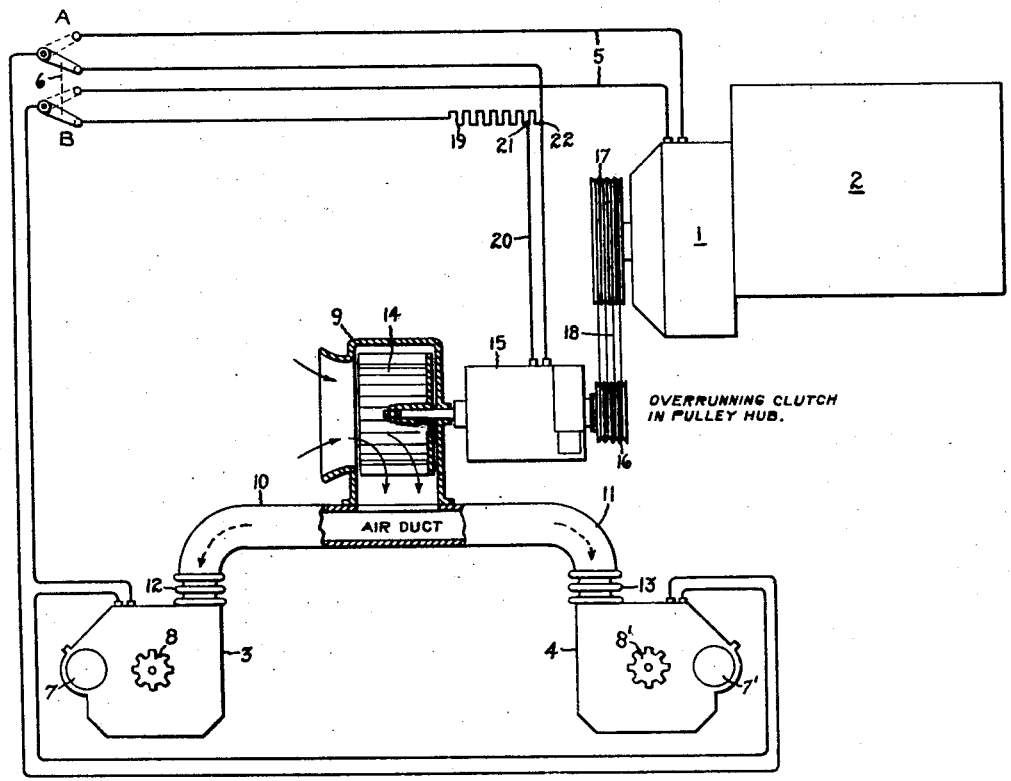
Inventor:
John W. Teker,
by Prowell S. Mack
His Attorney.

Patented July 13, 1948

2,445,192

UNITED STATES PATENT OFFICE 2,445,192

TRACTION MOTOR BLOWER CONTROL

John W. Teker, Wesleyville, Pa., assignor to General Electric Company, a corporation of New York Application December 19, 1946, Serial No. 717,182

9 Claims. (Cl. 318—255)

1

My invention relates to traction motor blower control systems, and more particularly to an automatic system for supplying ventilating air to traction motors for self-propelled vehicles.

The trend in modern Diesel-electric locomotives and other types of self-propelled vehicles is toward the provision of dynamic or electric braking in addition to the conventional air and mechanical brake systems. It has long been a problem to adequately ventilate and cool the traction motors of such vehicles during braking periods when they are operating as generators supplying the power to be dissipated to a braking resistor. One solution which has been extensively used is the provision of a motor driven blower, separately controlled, for varying the amount of cooling air supplied to the traction motors. This system involves considerable extra control equipment and auxiliary generator capacity, since in order to insure adequate ventilation the blower motors are usually operated at maximum capacity, otherwise a complex blower speed control system must be provided.

Another method has been the operation of the blower directly by gearing or belt drive from the main prime mover carried by the vehicle; however, during periods of electric braking it is customary to maintain the prime mover in an idling or low speed condition. Thus during periods of maximum braking the blower is being operated at minimum speed with a consequent minimum flow of cooling air to the motors under conditions when the greatest amount of cooling is required.

It is an object of my invention to provide an improved traction motor blower system for self-propelled vehicles.

It is another object of my invention to provide an improved ventilating system for traction motors which is automatically regulated in response to the braking effort.

It is a further object of my invention to provide an improved system for the ventilaton of traction motors that requires a minimum of additional equipment and is simple and efficient in its operation.

For a more complete understanding of my invention, reference should now be had to the accompanying drawing which shows diagrammatically a preferred embodiment of my traction motor blower system as applied to a self-propelled prime-mover driven direct current vehicle. It should be understood that only those parts of the vehicle drive and control system that are pertinent to my invention have been shown as the

2 understanding of my invention is thereby greatly simplified.

Referring now to the drawing, I have shown a main traction generator 1 arranged to be driven by a prime mover 2, such as a Diesel engine mounted on the vehicle. It is equally applicable to any other form of prime mover, such as a fluid turbine. The direct current output of the generator is supplied to the armatures of a pair of traction motors 3 and 4 through the main line conductors 5 and the necessary control equipment (not shown) for energizing the traction motors in any desired arrangement, such as a loop-series circuit or series-parallel or parallel combinations. A two-position switch 6 is provided for connecting the motors to the generator in the motoring position A, and for reconnecting the motors to the braking resistor in the braking position B.

It should be understood that only the armature or power circuit connections for the traction motors and generator are shown in the drawing, as illustration of the field excitable circuits and control therefor is not essential to an understanding of my invention. It is preferable in a dynamic braking system of this type to connect only the motor armatures to the braking resistors and separately excite the fields for better control during the braking period. The traction motors 3 and 4 may be of any well known direct current type adapted for axle mounting by means of the axle bearings 7 and 7', and the armature pinions 8 and 8', respectively, are arranged to drive the vehicle driving wheels through gearing or flexible drives as commonly used in the railway art. The traction motors 3 and 4 are provided with ventilating passages throughout their structure through which air is circulated during periods of operation by means of the rotary blower 9 and the air ducts 10 and 11, which are shown as connected to the motor casings by means of the flexible duct connectors 12 and 13. The blower 9 is provided with a rotor 14 which is arranged to be driven by an auxiliary D.-C. motor 15 and also mechanically connected to the V-belt pulley 16. The outboard end of the generator armature is also provided with a V-belt pulley 17 so that during periods of ordinary motoring operation of the vehicle, the blower 9 is driven at a speed proportional to the speed of the main engine and generator by means of the V-belt 18. The V-belt pulley 16, mounted on the auxiliary motor and blower shaft, incorporates within the pulley hub an over-running or free-wheeling clutch device so that as long as driving power is being supplied by the V-belt 18 from the pulley 17, power will be transmitted through the overrunning clutch in the hub 16, thus serving to drive the auxiliary motor 15 and blower rotor 14 at a speed proportional to the engine generator speed. Since the power supplied to the motors 3 and 4, and consequently the heat developed therein, will be greatest during periods of maximum load on the vehicle, the speed of the engine generator set will be at maximum under these conditions; consequently, the traction motors will be supplied with the greatest volume of cooling air under maximum load conditions. However, during periods of electric braking it is customary to allow the prime mover 2 to remain in an idling condition which, in accordance with this arrangement, would result in minimum speed of operation of the blower 9. Under conditions of electric braking, the traction motors 3 and 4 may be developing as much or more power than during motoring operations; hence, the need for adequate cooling is fully as great under braking conditions as under motoring conditions.

In order to increase the amount of ventilating air to the motors under braking conditions, I have provided self-regulating means for operating the blower 9 at a speed proportional to the load being carried by the traction motors 3 and 4 during the braking operation. Thus when the system is set up for electric braking, a double-pole, double-throw switch 6 in the main generator-motor circuit 5 will be in the position B as shown in the drawing, thereby completing the circuit from the traction motors 3 and 4 in series and through the braking resistor 19. Thus, the entire electrical output of the motors during braking operation will be dissipated in the braking resistor 19, and the power being dissipated in this resistor is therefore proportional to the power and also heating developed in the traction motors. The auxiliary blower motor 15 is permanently electrically connected across a portion of the braking resistor, the motor conductors 20 being connected at points 21 and 22 so that a voltage is applied to the auxiliary motor 15 proportional to the total voltage appearing across the braking resistor 19 during braking periods. As the load being dissipated in the braking resistor 19 increases, the voltage across the points 21 and 22 rises and energizes the auxiliary blower motor 15 so that it begins to assist in driving the blower 9. As the voltage applied to the motor 15 increases further due to increased power dissipation of the braking resistor, the motor will completely unload the mechanical drive through the overrunning clutch in the pulley hub 16, thereby completely isolating the blower from the engine and generator which, under these conditions, is running at idling speed. The speed of the blower 9 is, therefore, independent of the idling speed of the mechanical drive once the motor 15 has accelerated to a speed above the speed of the mechanical drive and will continue to remain so until the braking energy decreases to the point where the idling speed of the engine is greater than the driving speed of the motor 15, at which point the overrunning clutch will again engage and continue to drive the blower at constant minimum speed.

The speed of the blower during the dynamic braking period is, therefore, independent of the engine speed and is varied directly with the amount of energy being dissipated in the braking resistor 19, thereby closely relating the amount of air supplied to the motors 3 and 4 during braking in accordance with the power output of the motors and thus preventing over-heating which would occur if the blower operated at a fixed low speed value as would be the case with a straight mechanical drive.

The system as thus described has the advantages in that auxiliary main generator capacity is not required, the volume of air supplied is directly related to the heating conditions existing in the traction motors, and additional complex control apparatus for governing such air supply is not required. Also, the energy required to drive the auxiliary blower motor 15 is secured from energy being dissipated in the braking resistor which would otherwise be transformed into heat and lost. The system lends itself well to application to self-propelled vehicles that were originally built without provision for electric braking as it may be easily installed without the addition of complex control equipment.

While I have shown and described my invention as applied to a particular system and as embodying various devices diagrammatically shown, it will be obvious to those skilled in the art that changes and modifications may be made without departing from my invention, and I, therefore, aim in the appended claims to cover all such changes and modifications as fall within the true spirit and scope of my invention.

What I claim as new and desire to secure by Letters Patent of the United States is:

1. A dynamo-electric machine ventilating system comprising, in combination, a dynamo-electric machine, a dynamic braking resistor, switching means for connecting said machine to said resistor during dynamic braking, means for supplying cooling air to said machine, prime mover means for driving said air supply means, auxiliary dynamo-electric means for driving said air supply means, said auxiliary dynamoelectric means arranged to be responsive to current in said dynamic braking resistor and means operative upon attainment of a predetermined speed of said auxiliary dynamoelectric means for rendering said prime mover means ineffective to drive said air supply means.

2. A traction motor blower system for a prime mover driven self-propelled vehicle comprising, in combination, an electric traction motor, a dynamic braking resistor therefor, a ventilating blower for said motor, power transmission means for driving said blower from said prime mover, dynamo-electric means for driving said blower at a speed proportional to the electrical power being dissipated in said resistor, and means for disconnecting said power transmission means from said blower when the speed of said dynamo-electric drive means exceeds the speed of said power transmission means, said disconnecting means comprising a unidirectional power transmission device.

3. A ventilating control system for a dynamo-electric machine comprising, in combination, a dynamo-electric machine, an electric braking resistor, switching means for connecting said machine to said resistor during dynamic braking, means for supplying ventilating air to said machine, means for driving said air supply means at a substantially constant speed, auxiliary dynamo-electric means for driving said air supply means at a speed proportional to the power developed in said machine during dynamic braking, and means for disabling said constant speed drive means when the speed of said auxiliary dynamo-electric means exceeds the speed of said constant speed drive means.

4. A ventilating control system for a dynamo-electric machine comprising in combination, a dynamo-electric machine, an electric braking resistor, switching means for connecting said machine to said resistor during dynamic braking, means for supplying ventilating air to said machine, means for driving said air supply means at a substantially constant speed, auxiliary dynamo-electric means for driving said air supply means at a speed proportional to the power developed in said machine during dynamic braking, and means for disabling said constant speed drive means when the speed of said auxiliary dynamo-electric means exceeds the speed of said constant speed drive means, said disabling means comprising an overrunning mechanical clutch device.

5. A traction motor blower system for a prime mover driven self-propelled vehicle comprising, in combination, a direct current traction motor, a dynamic braking resistor for said motor, blower means for supplying air to said motor, first means for driving said blower at a speed proportional to said prime mover, second means for driving said blower at a speed proportional to the current flowing in said braking resistor, and selective power transmission means for disconnecting said first driving means when its speed is less than said second driving means.

6. A traction motor blower system for a prime mover driven self-propelled vehicle comprising, in combination, a direct current traction motor, a braking resistor for said motor, switching means for connecting said motor to said resistor, blower means for supplying air to said motor, first means for driving said blower at a speed proportional to said prime mover, a second means for driving said blower at a speed proportional to the power being dissipated in said braking resistor, and unidirectional power transmission means for disconnecting said first driving means when its speed is exceeded by the speed of said second driving means.

7. A traction motor blower system for a prime mover driven self-propelled vehicle comprising, in combination, an electric traction motor, a dynamic braking resistor therefor, a ventilating blower for said motor, power transmission means interposed between said blower and said prime mover, and auxiliary motor for driving said blower at a speed proportional to the current flowing in said resistor, and means for disengaging said power transmission means from said blower when the speed of said auxiliary motor drive means exceeds the speed of said power transmission means, said disengaging means comprising a free wheeling clutch device.

8. A traction motor blower system for a prime mover driven self-propelled vehicle comprising, in combination, an electric traction motor, means for establishing dynamic braking connections for said motor, a ventilating blower for said motor, power transmission means for driving said blower from said prime mover, auxiliary means for driving said blower at a speed proportional to the dynamic braking energy developed in said motor, and means for disabling said power transmission means when the speed of said auxiliary drive means exceeds the speed of said power transmission means.

9. A traction motor blower system for a prime mover driven self-propelled vehicle comprising, in combination, an electric traction motor, means for establishing dynamic braking connections for said motor, a ventilating blower for said motor, power transmission means for driving said blower from said prime mover, auxiliary means for driving said blower at a speed proportional to the dynamic braking energy developed in said motor, and means for disabling said power transmission means when the speed of said auxiliary drive means exceeds the speed of said power transmission means, said disabling means comprising a unidirectional power transmission device.

JOHN W. TEKER.